United States Patent [19]

Spector

[11] Patent Number: 5,090,561

[45] Date of Patent: Feb. 25, 1992

[54] COMPACT DISC PACKAGE

[76] Inventor: Donald Spector, 380 Mountain Rd., Union City, N.J. 07087

[21] Appl. No.: 701,078

[22] Filed: May 16, 1991

[51] Int. Cl.⁵ .............................................. B65D 85/30
[52] U.S. Cl. ..................................... 206/313; 206/444
[58] Field of Search ........................ 206/312, 313, 444

[56] References Cited

U.S. PATENT DOCUMENTS

| | | | |
|---|---|---|---|
| 2,777,574 | 1/1957 | Brody | 206/313 |
| 4,402,405 | 9/1983 | Fullalove | 206/312 X |
| 4,473,153 | 9/1984 | Colangelo | 206/313 X |
| 4,850,731 | 7/1989 | Youngs | 206/313 X |
| 4,899,875 | 2/1990 | Herr et al. | 206/313 |
| 5,031,772 | 7/1991 | Woodriff | 206/444 |
| 5,048,681 | 9/1991 | Henkel | 206/444 |

FOREIGN PATENT DOCUMENTS

| | | | |
|---|---|---|---|
| 1215093 | 11/1959 | France | 206/313 |
| 1475792 | 2/1967 | France | 206/312 |
| 2620258 | 3/1989 | France | 206/444 |

Primary Examiner—William I. Price
Attorney, Agent, or Firm—Michael Ebert

[57] ABSTRACT

A package for a compact disc having a sound or video recording (CD or VCD) on one face thereof, the unrecorded face of the disc having printed thereon a picture of a character, such as a figure of historical political or military importance. The recording on the disk is a story of other instructive matter related to the illustrated character, so that when the disc is played, a story or information relating to the character is visually or aurally presented. The disc is stored in a circular well formed in a rectangular card having printed thereon the identity of the pictured character and other identifying data relating thereto. The disc-loaded card is inserted in a transparent plastic sleeve having matching dimensions to provide a card-like package which may be manipulated in play activity as well as stored or displayed. To play the disc in an optical player, the card is removed from the sleeve and the disc withdrawn from the card.

9 Claims, 2 Drawing Sheets

COMPACT DISC PACKAGE

BACKGROUND OF INVENTION

1. Field of Invention

This invention relates generally to packages for compact disc audio or video recordings, and in particular to a compact disc package which not only serves to protectively store the disc and to expose a picture printed on the disc, but also makes it possible to play with the card-like packages in the manner of baseball cards.

2. Status of Prior Art

Digital techniques are now widely used to make sound and video recordings. Thus when recording music or speech, the analog signal output of the microphone amplifier is sampled and converted into a stream of digital bits that are recorded on magnetic tape and then transferred from the tape to a rotating master disc. The recording on the master disc is in the form of microscopic indentations in a spiral track on one surface of the disc. The master disc is used to create stampers for pressing vinyl records, called compact discs or CD's. The player for the CD record uses a laser beam optical pick-up and makes no physical contact with the disc. A similar technique is used to make digital video recordings, the resultant video compact discs being referred to as VCD's. As used herein, the term compact disc encompasses both CD's and VCD's.

The conventional package for a compact disc consists of a rectangular casing molded of transparent, flexible plastic material having two side-by-side compartments, one to accommodate a transparent, rigid plastic cassette housing the disc, the other containing a printed paper folder. Printed on the front and rear cover of the folder is a picture of the recorded performer, say, a rock star. The rear cover also has printed thereon the identity of the songs recorded on the disc.

In order to obtain access to the disc in a conventional DC package, one must break open the sealed casing, and then remote the disc from its cassette, the ruptured casing being discarded. One can also discard the folder, for the identify of the performer and of the songs or music performed is printed on the unrecorded face of the compact disc.

A conventional CD package, because of its nature, is relatively expensive to make. Moreover, the shelf or counter space taken by a conventional package in terms of length, width and depth is much greater than that taken by the disc itself. This presents a problem; for in the typical retail establishment, shelf and counter space are at a premium, and the dimensions of the conventional package limit the number of packages that can be kept in stock.

A major concern of the present invention is with respect to the educational as well as the entertainment value of CD's or VCD's intended for children. Many children are avid collectors of so-called baseball cards. Each such card carries not only a picture of a well-known baseball player, but also some biographical material regarding the player and his past performance record. To the extent that studying and collecting baseball cards enlarges a child's knowledge of baseball, it has educational value, though some parents may regard such knowledge as trivia.

A child who collects baseball cards usually seeks to add to his collection by trading with other collectors, or by competitive play in which the players flip baseball cards, very much in the fashion of playing heads or tails with coins.

Thus a child who has a particular interest in the New York Yankees baseball team, to enlarge his collection of players on this team, will sell or play off cards he holds on "Giants" team players. The present invention provides a compact disc package in a card format so that the package may be manipulated by a child in the manner of a baseball card, yet provide educational benefits far greater than those afforded by baseball cards.

SUMMARY OF INVENTION

In view of the foregoing, the main object of this invention is to provide a compact disc package in a card format whose dimensions are only slightly greater than that of the disc housed therein, whereby the package serves both to store and display the disc, and as a playing card.

More specifically, an object of this invention is to provide a package of the above type in which printed on the unrecorded face of the disc is a picture of a character or personage such as that of Abraham Lincoln or Albert Einstein, the recording on the other face of the disc being a narrative account or story relating to the pictured character, so that the disc possesses educational as well as entertainment value.

A significant feature of a CD package in a card format in accordance with the invention is that it lends itself to being traded or played with in the manner of baseball cards.

Also an object of the invention is to provide compact disc packages that can be mounted on a wall or display board and thereby exhibited as a picture collection.

Still another object of the invention is to provide a compact disc package which fully protects the disc housed therein yet is inexpensive to manufacture and mass produce as compared to conventional packages.

Briefly stated, these objects are attained in a package for a compact disc having a sound or video recording (CD or VCD) on one face thereof, the unrecorded face of the disc having printed thereon a picture of a character. This character may be a figure of historical, political or military importance, or a well-known sports figure, or a prehistoric animal such as a dinosaur. The recording on the disc is a story of other subject matter pertinent to the illustrated character. Hence when the disc is played, a story or information relating to the character is visually or aurally presented.

The disc is stored in a circular well formed in a rectangular card having printed thereon the identity of the pictured character and other identifying data relating thereto. The disc-loaded card is inserted in a transparent plastic sleeve having matching dimensions to provide a card-like package which may be manipulated in play activity as well as stored or displayed. To play the the disc in an optical player, the card is removed from the sleeve and the disc withdrawn from the card.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
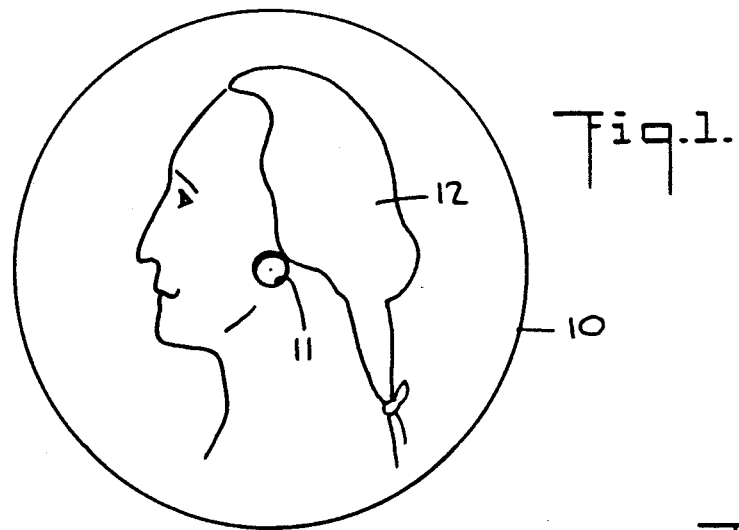
FIG. 1 shows a compact disc record in accordance with the invention.

Referring now to FIG. 1, there is shown a compact disc 10 in accordance with the invention, the disc having a center hub hole 11 so that the disc can be mounted on the spindle of an optical player. The disc is formed of transparent plastic material whose recording face (not shown) has a spiral track formed thereon that is coated with a reflective film.

Printed on the unrecorded face of the disc is a picture 12 of a character about whom revolves the story or other subject matter recorded on the other face of the disc.

By way of example, picture 12 is that of George Washington, and the recorded story is a biographical sketch of President Washington and his participation in the American Revolution. Since the record is intended for children of primary school age, the recording will be at the appropriate teaching level.

The term "character" as used herein refers to any figure or personage of historical, political, scientific or military importance, as well as any well-known actor or sports figure that children wish or ought to know more about. The term "character" also includes animals, such as prehistoric dinosaurs and apes who play a role in the evolution of man. Hence the disc recording in all cases is germane to the particular character that is pictured on the disc.

Thus if the picture on the disc is that of Babe Ruth, the legendary batter with the New York Yankees, then the CD recording may start out with the theme "Take Me Out to The Ball Game" or Frank Sinatra singing "New York, New York," followed by the roar of the crowd at a baseball stadium, and then a narrative account of Babe Ruth's career.

Whether the recording is that of a sports figure or a historical figure, the recording, since it is intended to entertain as well as to educate, should not be in the form of school room lecture but should include dramatic effects to heighten interest in the character, and in doing so, induce the listener to listen to the entire recording.

Figure 2:
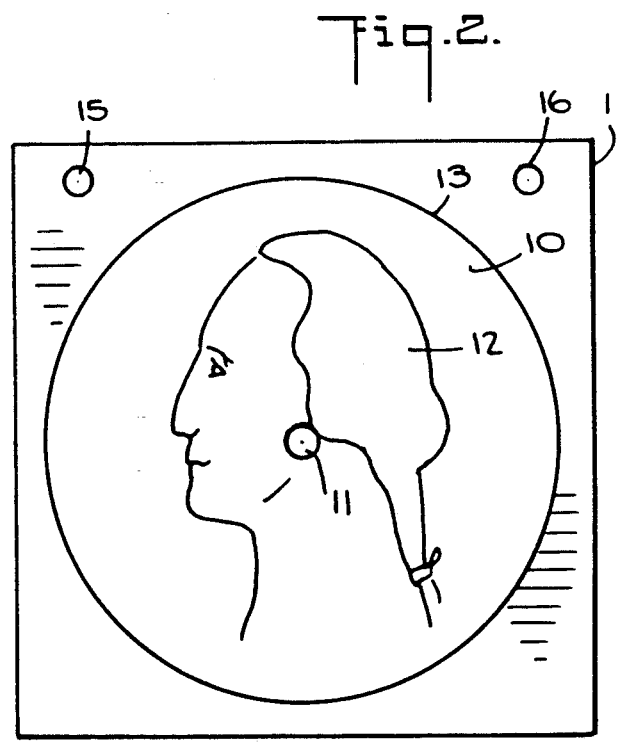
FIG. 2 illustrates the front face of a card in which the disc is seated.
Figure 3:
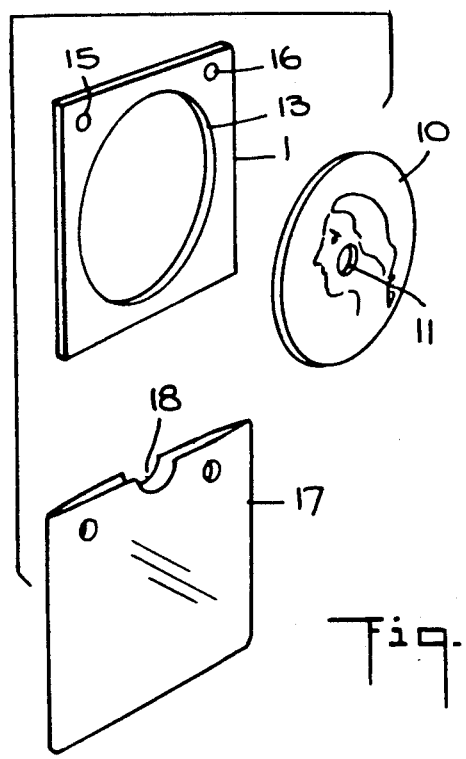
FIG. 3 is an exploded view of a package in accordance with the invention.

As shown in FIGS. 2 and 3, a compact disc 10 (whether a CD or VCD) is seated in a circular well 13 die cut or otherwise created in a rectangular card 14 fabricated of flexible material such as paperboard or plastic. The diameter of the well substantially matches that of the disc so that the disc is snugly received therein. In practice, the well may take the form of a depression in the card having at its center a raised hub defined by spring fingers to engage the center hole 11 in the disc. In order to remove the disc from the well, one has only to flex the card to release the disc.

Figure 4:
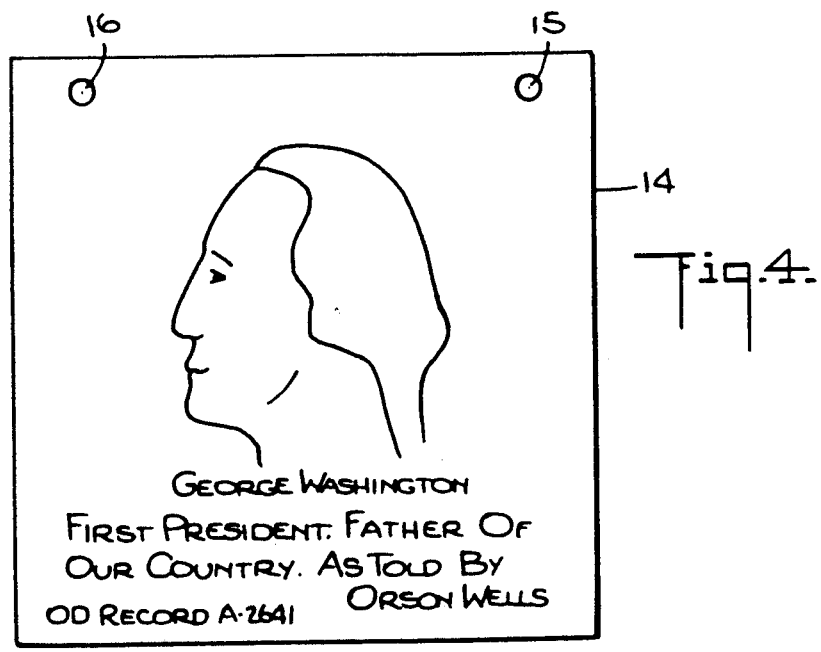
FIG. 4 shows the rear face of the card.

Card 14 is provided with small holes 15 and 16 at its upper corners. Assuming that card 14 has a depressed well on one side to record the CD record, printed on the opposite side of card 14, as shown in FIG. 4, is the same picture of George Washington (or whatever other character is involved in the recording) as well as printed matter to identify the record and its manufacturer. When, in the alternative, the card is die cut to provide a circular opening to accommodate the record, in that case, identifying data is printed on the card in the region surrounding the record. But in all cases, the disc is flush with the card and does not protrude therefrom.

Figure 5:
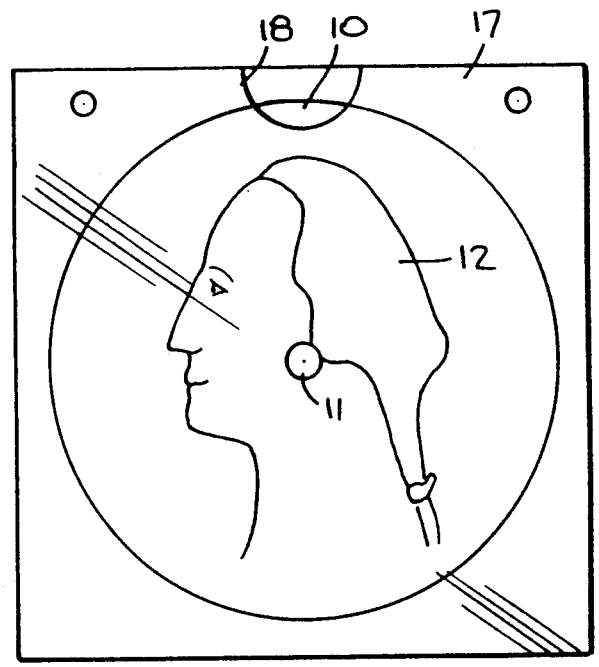
FIG. 5 illustrates the disc-loaded card inserted in a sleeve to complete a package in accordance with the invention.

As shown in FIGS. 3 and 5, the disc-loaded card 14 is inserted in a pocket or sleeve 17 whose dimensions substantially match those of the card. Sleeve 17 is fabricated of relatively soft, transparent, synthetic plastic material such as polyethylene so that both sides of the card and the disc therein are viewable through the sleeve.

Sleeve 17 is provided at its upper end on either side with a finger notch 18 to facilitate removal of the disc-loaded card from the sleeve.

Thus the card-like package is constituted by the disc-loaded card jacketed within the sleeve. This assembly or package, because it is card-like and relatively stiff, may be manipulated or flipped in the manner of a baseball card, so that a child with a stack of such packages can enter into card trading and flip-play activity.

To play a recording, the child removes the disc-loaded card from its sleeve, then takes the disc out of the card and inserts it in a player. Upon completion of play, the child returns the disc to the card and inserts the disc-loaded card back into its sleeve for storage and transportation purposes. In practice, the package may be sealed in a transparent plastic film envelope or jacket.

Figure 6:
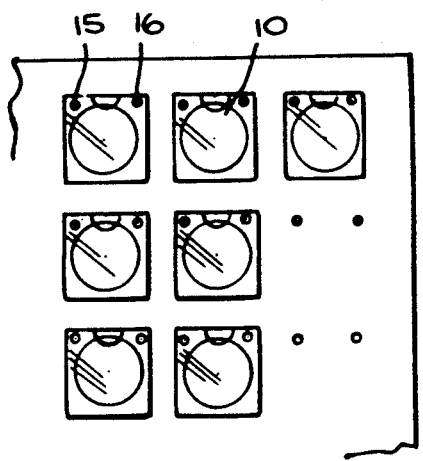
FIG. 6 shows several packages mounted on a wall for purposes of display.

A child who takes pride in his collection may wish to display it on a wall or board, as shown in FIG. 6. Because of mounting holes 15 and 16 in the card which are visible through the clear sleeve, it is a simple matter to pin the package to a wall or board, the pins going through the soft plastic sleeve corners and the mounting holes in the card. In this display mode, the pictures on the discs face out so that one can exhibit a set of American presidents or famous sports figures, or whatever other characters are in the child's collection.

Whatever the character pictured on the CD or VCD, the sound or video recording is directly related to this character. And since the recording has a duration of at least a half hour, a great deal of information can be supplied in regard to the character; hence the educational value of the disc is high.

While there has been shown and described a preferred embodiment of a compact disc assembly or package in accordance with the invention, it will be appreciated that many changes and modifications may be made therein without, however, departing from the essential spirit thereof.

I CLAIM:

1. A compact disc package in a card format comprising:
   (a) a compact disc having a picture of a character printed on one face thereof and a spiral track recording on the other face whose subject matter is related to the pictured character;
   (b) a rectangular card formed of relatively stiff, flexible material having a circular recess therein in which the disc is nested to provide a loaded card, the thickness of the card being such that neither face of the disc protrudes from the card; and
   (d) a sleeve formed of transparent plastic material receiving the disc-loaded card and having substantially the same dimensions, whereby the picture is visible through the sleeve.

2. A package as set forth in claim 1, in which the recess is a circular well depressed in one surface of the card.

3. A package as set forth in claim 1, wherein said recess is a circular hole die-cut in the card.

4. A package as set forth in claim 1, wherein said card is formed of plastic material.

5. A package as set forth in claim 2, wherein the opposite surface of the card has a picture of the same character.

6. A package as set forth in claim 1, wherein said sleeve is provided at its upper end with a finger notch to facilitate removal of the disc-loaded card.

7. A package as set forth in claim 1, wherein said card is provided at its upper corners with mounting holes.

8. A package as set forth in claim 1, wherein said compact disc has a sound recording thereon.

9. A package as set forth in claim 1, wherein said compact disc has a video recording thereon.

* * * * *